United States Patent [19]

Tilden

[11] Patent Number: 5,325,031
[45] Date of Patent: Jun. 28, 1994

[54] ADAPTIVE ROBOTIC NERVOUS SYSTEMS AND CONTROL CIRCUITS THEREFOR

[76] Inventor: Mark W. Tilden, 251 Erb St. W., Waterloo, Ontario, Canada, N2L 1V8

[21] Appl. No.: 898,836

[22] Filed: Jun. 15, 1992

[51] Int. Cl.⁵ .............................................. G06F 15/50
[52] U.S. Cl. ........................... 318/568.11; 318/568.16; 395/21; 901/1
[58] Field of Search .............................. 318/560–589; 395/80–89; 180/8.1–8.9; 901/1, 2, 3, 7, 9

[56] References Cited

U.S. PATENT DOCUMENTS

| | | | |
|---|---|---|---|
| 5,005,658 | 4/1991 | Bares et al. | 180/8.1 |
| 5,016,188 | 5/1991 | Lan . | |
| 5,021,878 | 6/1991 | Lang | 901/46 |
| 5,032,740 | 7/1991 | Kannegundla | 307/264 |
| 5,040,626 | 8/1991 | Paynter | 180/8.1 |
| 5,045,713 | 9/1991 | Shima | 307/201 |
| 5,120,996 | 6/1992 | Mead et al. | 307/201 X |
| 5,124,918 | 6/1992 | Beer et al. | 364/424.02 |
| 5,136,176 | 8/1992 | Castro | 307/201 |
| 5,136,177 | 8/1992 | Castro | 307/201 |
| 5,136,178 | 8/1992 | Castro | 307/201 |
| 5,180,938 | 1/1993 | Sin | 307/605 |

OTHER PUBLICATIONS

SPIE Robotics Newsletter–Apr., 1992.
Mathematical Recreations–A. K. Dewdney, Scientific American, Jul., 1991, pp. 118–121.
A Robot That Walks–Rodney A. Brooks, published 1989; pp. 99–108.
Evolving Dynamical Neural Networks for Adaptive Behavior–Randall D. Beer et al., published 1992, Case Western Reserve University, particularly pp. 19–24.
A Biological Perspective on Autonomous Agent Design–Randall D. Beer et al., published 1990, North-Holland Robotics and Autonomous Systems 6 (1990) 169–86, particularly pp. 175–178.

*Primary Examiner*—Paul Ip
*Attorney, Agent, or Firm*—Ridout & Maybee

[57] ABSTRACT

A self-stabilizing control circuit utilizing pulse delay circuits for controlling the limbs of a limbed robot, and a robot incorporating such a circuit, are provided. The pulse delay circuit acts as an artificial "neuron" which drives servo motors according to a selected sequence which is reconfigurable in response to signals from local or remote sensors. Also disclosed is a pulse neutralizing circuit which can be used to stabilize and reconfigure sequencing loops and chains incorporating the pulse delay circuit, and which can modify the actuation processes controlled thereby.

19 Claims, 6 Drawing Sheets

ADAPTIVE ROBOTIC NERVOUS SYSTEMS AND CONTROL CIRCUITS THEREFOR

FIELD OF INVENTION

This invention relates to autonomous robot nervous system designs. In particular, this invention relates to a self-stabilizing control circuit for controlling the limbs of any limbed robot, and a robot incorporating such a circuit.

BACKGROUND OF THE INVENTION

Autonomic robots have innumerable potential applications on both industrial and domestic levels. They are potentially capable of performing many mundane tasks which until now only human beings or other higher vertebrates have been capable of performing, to both increase productivity and improve quality of life. Such robots are particularly useful in applications which pose a hazard to living beings, for example in security functions, dealing with toxic materials, working in hazardous environments, and so on.

Many attempts have been made to design a self propelled autonomous robot, and to date the most successful designs have involved wheeled devices. However, wheeled devices have very limited utility in many environments. More than half of earth's landmass is impassable by wheeled vehicles of today's conventional size, let alone miniature or toy sized devices. Wheels are simply unsuitable in many environments, for example in rough or soft terrain. Moreover, any wheeled device is restricted to largely horizontal travel, since traction relies entirely on the force of gravity.

On the other hand, legged devices are capable of travelling on virtually any type of terrain. Such devices, although slower than wheeled devices, are far more versatile and adaptive to their environment, are capable of traversing obstacles that are impassable to wheeled devices, and if properly equipped are able to climb vertically. However, there are very few problems more difficult in modern robotics than building successful legged devices. Once the classic difficulties of mechanical power requirements, interconnection complexity and excessive weight are overcome, there remains the problem of control.

Autonomous legged creatures, to move and react effectively within their environment, require precise synchronizing control circuitry and the ability to adapt to new conditions as they arise. Until now, all attempts to create such a device have involved elaborate arrangements of feedback systems utilizing complex sensor inputs and extensive control and sequencing circuitry hard-wired to one or more central processors. Such a robot is extremely complex and expensive to build, even to accomplish very simple tasks. Moreover, due to the complexity of such a device and its heavy reliance on a central processing system power requirements are enormous, and a relatively minor problem, such as injury to a limb, is likely to cause total system failure. Such walking devices are accordingly impractical for other than experimental or educational uses.

The present invention overcomes these and other disadvantages by providing an autonomic limbed device utilizing a completely different control system approach. Rather than utilizing a central processor to process sensor information and responsively drive all mechanical processes, the device of the present invention utilizes a reconfigurable central network oscillator to sequence the processes of the devices limbs, each of which is itself autonomous. Once activated, each limb sequentially executes its processes independent of the central sequencer.

The present invention further provides a pulse delay circuit, with a delay of variable duration, which connected to a second pulse delay circuit acts as an artificial "neuron". The central and limb-actuating processes are achieved by a number of such "neurons" connected in series. The delay duration is determined merely by an analogue bias input to one or more "neurons", which may be controlled remotely or in response to local sensor stimulation. In a walking device, for example, differential delay patterns cause the device to deviate from a straight forward walking motion in some predetermined manner, and through many of the well-known walking gaits.

The advantages of this design are numerous. The pulse delay circuit is very inexpensive, to the extent that a fully autonomous four legged walking device incorporating the present invention can cost less than one hundred dollars to build, and all components are presently available "off the shelf". Power requirements are very small. The control circuits simplify mechanical process controls to mere pulse trains, requiring no microprocessor, so that if a microprocessor is utilized it can be virtually entirely dedicated to task planning and information retrieval. The process controllers are self-stabilizing, and since each limb is essentially autonomous it is unnecessary to hardwire all actuators and sensors to the central torso; moreover, if a limb is damaged or malfunctions it can be removed from the sequence automatically, without affecting the central sequencing processes or the operation of any other limb.

The inventor has termed this technology VSPANS, an acronym for "Very Slow Propagation Artificial Neural Systems", described in detail below.

SUMMARY OF THE INVENTION

The present invention thus provides a sequencing circuit for controlling the motion of a mechanical limb actuated by at least one servo motor, comprising a plurality of pulse delay circuits connected in series.

The present invention further provides an autonomous device having at least one mechanical limb, comprising at least one servo motor attached to the limb to actuate motion thereof, a central sequencing loop comprising a plurality of pulse delay circuits connected in series to form a closed loop, and a limb control circuit comprising a chain of pulse delay circuits, the limb control circuit having a proximal pulse delay circuit, and an electrical power source for creating a source potential, whereby the input of the proximal pulse delay circuit in the limb control circuit is connected to an output of a pulse delay circuit in the central sequencing loop, such that a pulse propagating around the central sequencing loop periodically initiates activation of the proximal pulse delay circuit in the limb control circuit.

The present invention further provides a walking device including a plurality of limbs actuated by servo motors, having a central sequencing loop comprising a plurality of pulse delay circuits connected in series to form a closed loop, each servo motor being connected to a chain of pulse delay circuits connected in series and having a proximal pulse delay circuit the input of which is connected to the output of one of the pulse delay circuits in the central sequencing loop, and means for connecting a power source to the pulse delay circuits.

BRIEF DESCRIPTION OF THE DRAWINGS

In drawings which illustrate by way of example only a preferred embodiment of the invention.

DETAILED DESCRIPTION OF THE INVENTION

The present invention provides both a simple variable pulse delay circuit, and an autonomous limbed device in which a series of such pulse delay circuits are connected to form "neurons" which control the mechanical processes of the device. The device is described in terms of a simple four legged walking embodiment, however it will be apparent to those skilled in the art that the control circuitry can be applied to a number of limbs of various types, the number of pulse delay circuits being related to the number of servo motors employed in each limb.

Figure 1:
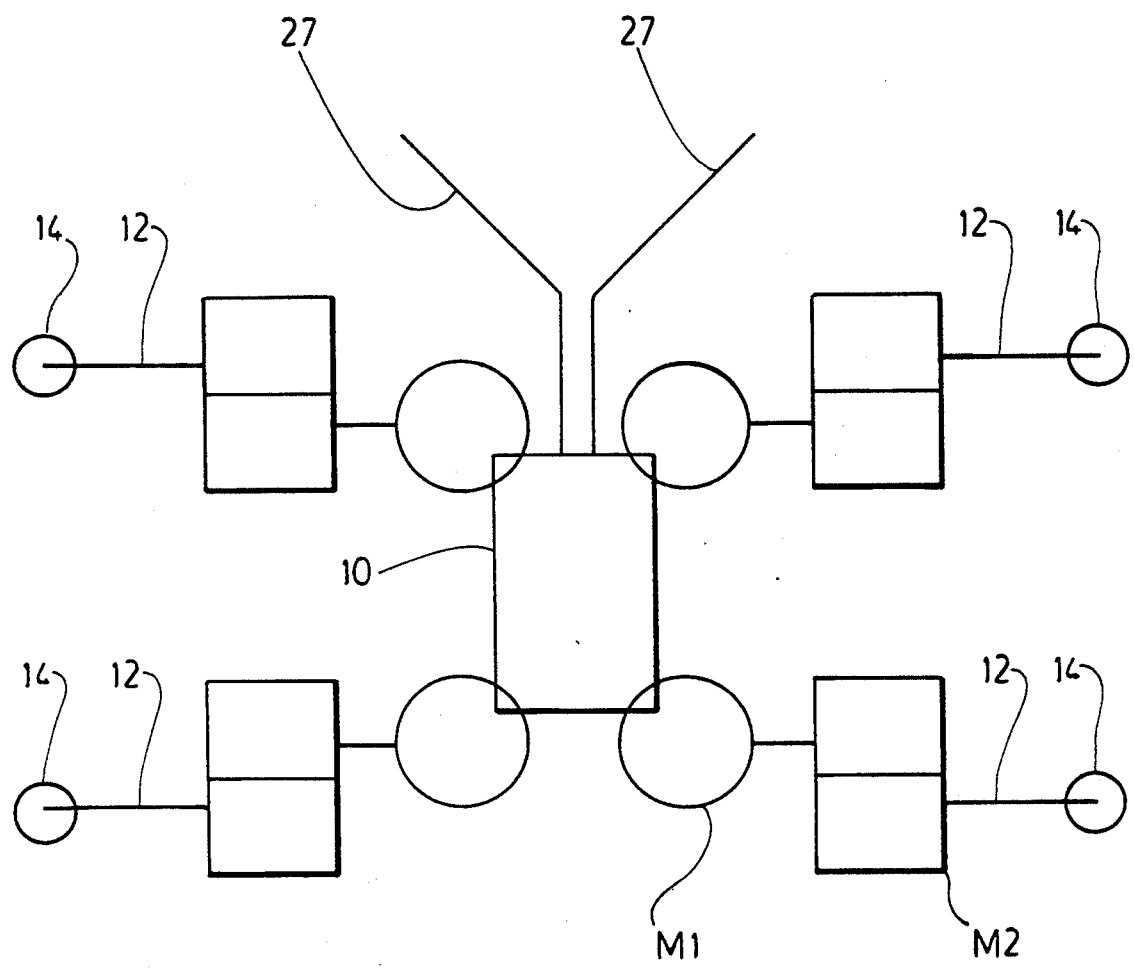
FIG. 1 is a representational illustration of a walking device of the present invention.

The walking device is illustrated representationally in FIG. 1. It incorporates conventional mechanical components including a frame 10, servo motors M1, M2 and wire limbs 12 each provided with a foot 14. The limbs 12 should not be completely rigid; it has been found that a certain amount of resilience in the limbs 12 renders the device somewhat more adaptive to any particular environment. The limbs 12 must of course be sufficiently strong to enable the device to carry out its intended task without buckling. The frame 10 carries the control circuitry and the power source (not shown).

In the embodiment illustrated, two servo motors M1, M2 actuate each limb 12. Each limb 12 is therefore capable of two degree movement—horizontal movement is actuated by a first motor M1, and vertical movement is actuated by a second motor M2, in conventional fashion. The actuation sequence is described below.

The mechanical structure of the illustrated embodiment is conventional. However, there are certain limitations peculiar to the construction of the four legged device illustrated. The device must be able to support itself on any three legs, in order for the fourth leg to be free to move; therefore the center of mass must be within a triangle formed between the feet 14 of the three stationary legs at any one time. Moreover, such a slow moving device is inherently unstable on less than three legs, so the control circuitry must synchronize leg movement such that no more than one leg is raised at any one time; because of this the legs must be somewhat resilient, so that movement of a single leg will draw the torso in the desired direction rather than being merely resisted by the three stationary legs.

Figure 3:
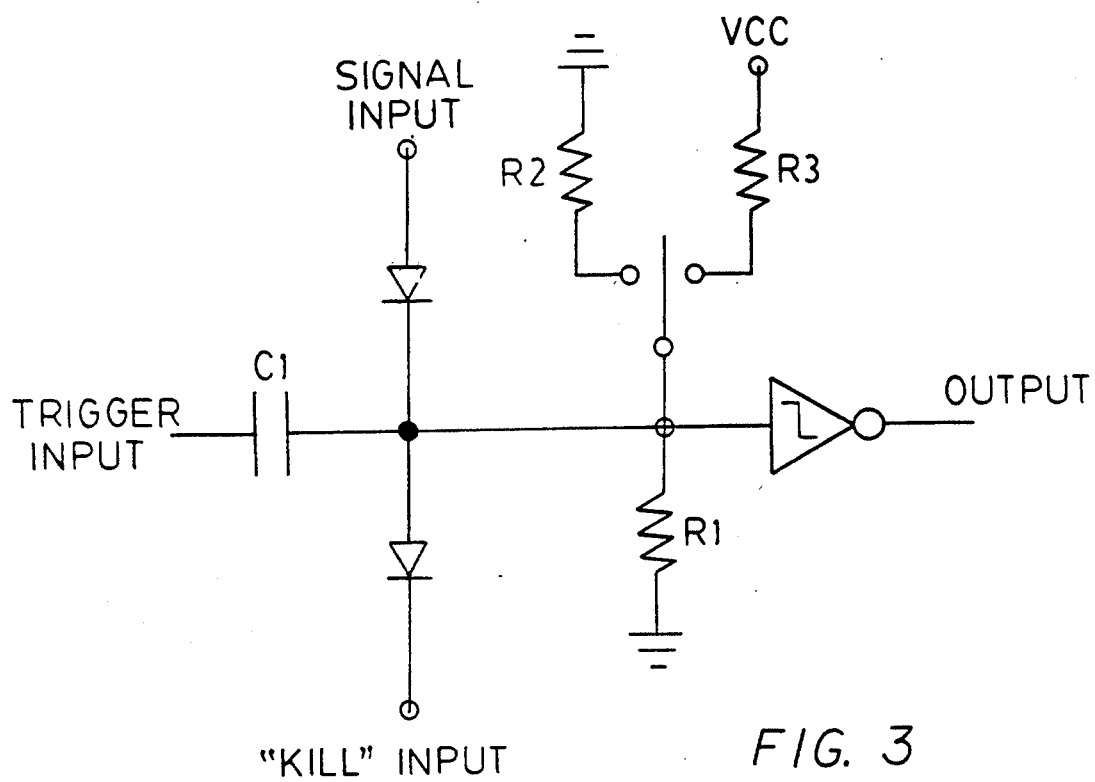
FIG. 3 is a schematic diagram of the pulse delay circuit (PDC)

The invention resides in the control circuitry for this walking device. Both the central sequencing loop 20 and each individual limb control circuit 22 comprise a number of pulse delay circuits, the preferred basic form of which is illustrated in FIG. 3, connected in series. The pulse delay circuit (PDC) illustrated in FIG. 3 is connected to another PDC in series to form an artificial "neuron" in the manner described below.

The central sequencing loop 20, which in the preferred embodiment illustrated consists of four PDC's, preferably also includes the pulse neutralizing circuit (PNC) illustrated in FIG. 5, as will be described more fully below. The limb control circuits 22 each further include motor amp/drivers to control the servo motors M1, M2, as described below. These three elements—the PDC, the pulse neutralizing circuit and the motor amp/driver—constitute the basic building blocks of the robot control circuitry of the present invention.

The robot control circuitry may optionally include one or more signal multiplexers 24, for selecting different walking gaits and directions of motion, and conventional sensors 26 for activating a multiplexer 24 or applying a bias potential to change the delay duration of any particular neuron. Multiplexers 24 are not strictly necessary, but they can simplify complex designs by avoiding the need for different loop topologies to reconfigure mechanical processes.

The design and operation of each component of a preferred embodiment of the robot control system will now be described in detail, using as an example the four legged device illustrated; however it will be readily apparent that the control system can be extended to many additional limbs of different types.

Figure 2:
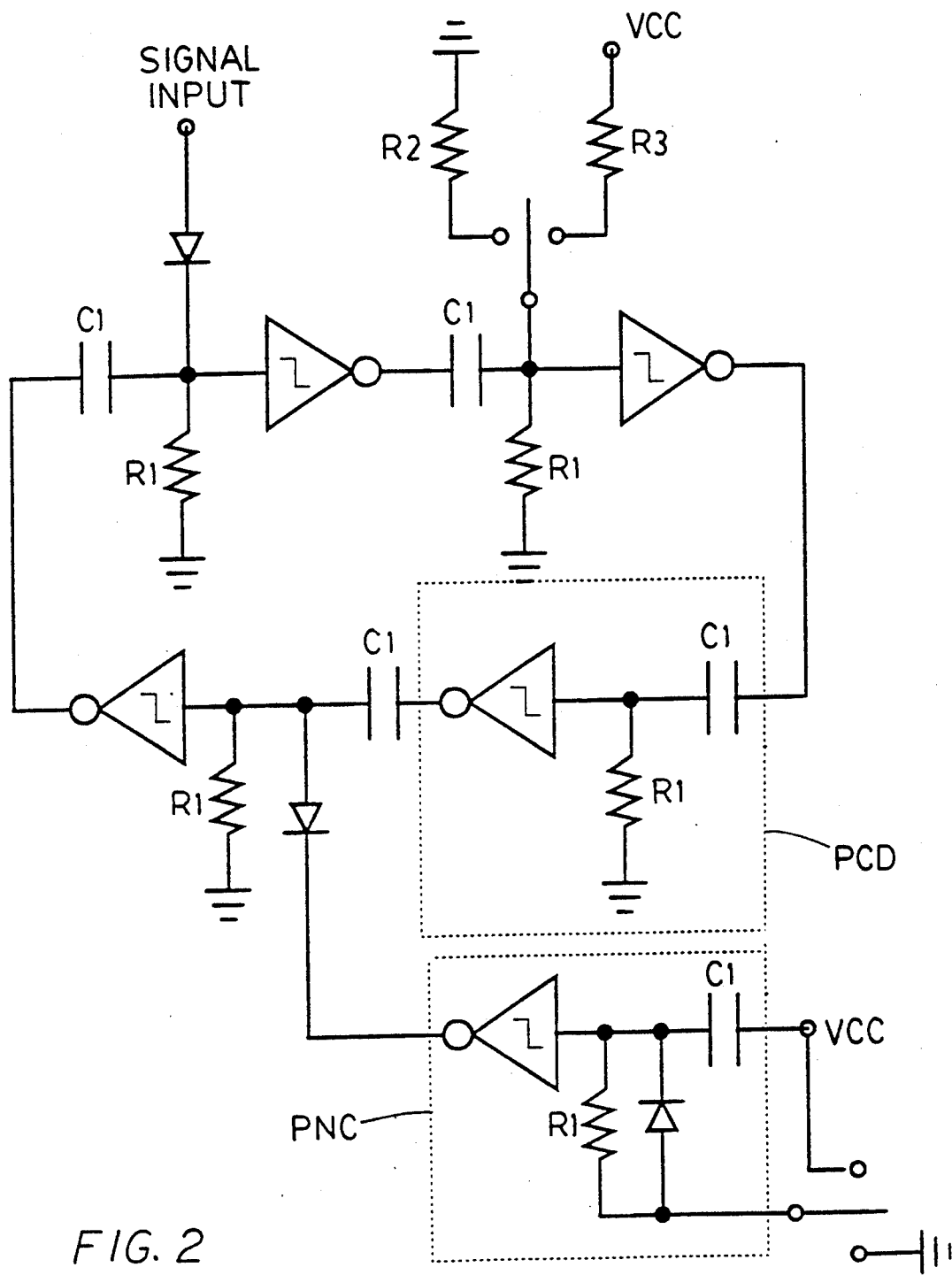
FIG. 2 is a schematic diagram of the central sequencing loop.

FIG. 2 illustrates the central sequencing loop 20 for the device of FIG. 1. It comprises four PDC's connected in series to form a closed loop which is, in effect, a network oscillator. Each individual PDC, illustrated in FIG. 3, comprises a CMOS with a Schmitt trigger protection circuit, preferably an MC14584 although most hex Schmitt trigger inverters will perform adequately. The inverter input is connected to the output of the previous PDC, and the inverter output is connected in series to a capacitor Cl connected in series to the input of the next PDC, and so on. Cl is preferably approximately 0.1 $\mu$F, and it is essential that there be no charge dissipation across capacitor Cl. The small capacitance of Cl results in greater energy efficiency, and protects the inverter inputs from potentially damaging voltage spikes.

A resistor R1 is connected to the input of each PDC. The resistors R1 may be referenced to ground, as shown in FIG. 3, in which case the PDC's will respond only to positive logic data and will be triggered by the leading edge of a pulse at the input of the inverter. Alternatively, resistors R1 may be referenced to the source voltage, in which case the PDC's will respond only to negative logic data and will be triggered by the trailing edge of a pulse at the input of the inverter. Resistor R1 is preferably in the order of 5 M$\Omega$ to 10 M$\Omega$ to obtain 0.25 to 1 second propagation time with the capacitor Cl described above.

The operation of a "neuron" will now be described (assuming the circuit is already powered up, which is described below) with reference to the embodiment illustrated in FIG. 2, which reacts to positive logic data. Connected to a low voltage DC power source, capacitors Cl are fully charged. When a pulse is introduced to the input of an inverter, the invertor outputs an inverted signal and the capacitor Cl discharges. The capacitor Cl immediately begins to charge, through resistor R1, generating a potential at the input of the next inverter in the sequence. However, because the next inverter has a Schmitt trigger, it will not output a signal, i e the next PDC will not "fire" until the inverter input potential reaches the threshold voltage of the CMOS. This is the operation of the sequencing delay, its duration or time constant t being represented by the equation $t = R1 \times C1 - K$, where K is determined by the threshold voltage of the particular form of Schmitt trigger used.

The time constant t can be decreased by biasing the PDC at resistor R1, for example through a resistor R2, to decrease the effective resistance of resistor R1 and thus decrease the charge time of the capacitor C1; the time constant t can be increased by shunting the capacitor to the source voltage, as through resistor R3, to increase its charge time (it has been found that the resistance of R3 must be at least 20% greater than the resistance of R1, to avoid neutralizing propagating pulses). It will thus be seen that by selectively biasing PDC's in the central sequencing circuit, the timing of the "firing" of each "neuron" can be readily controlled to initiate the motion of each leg 12, as described below.

Figure 4:
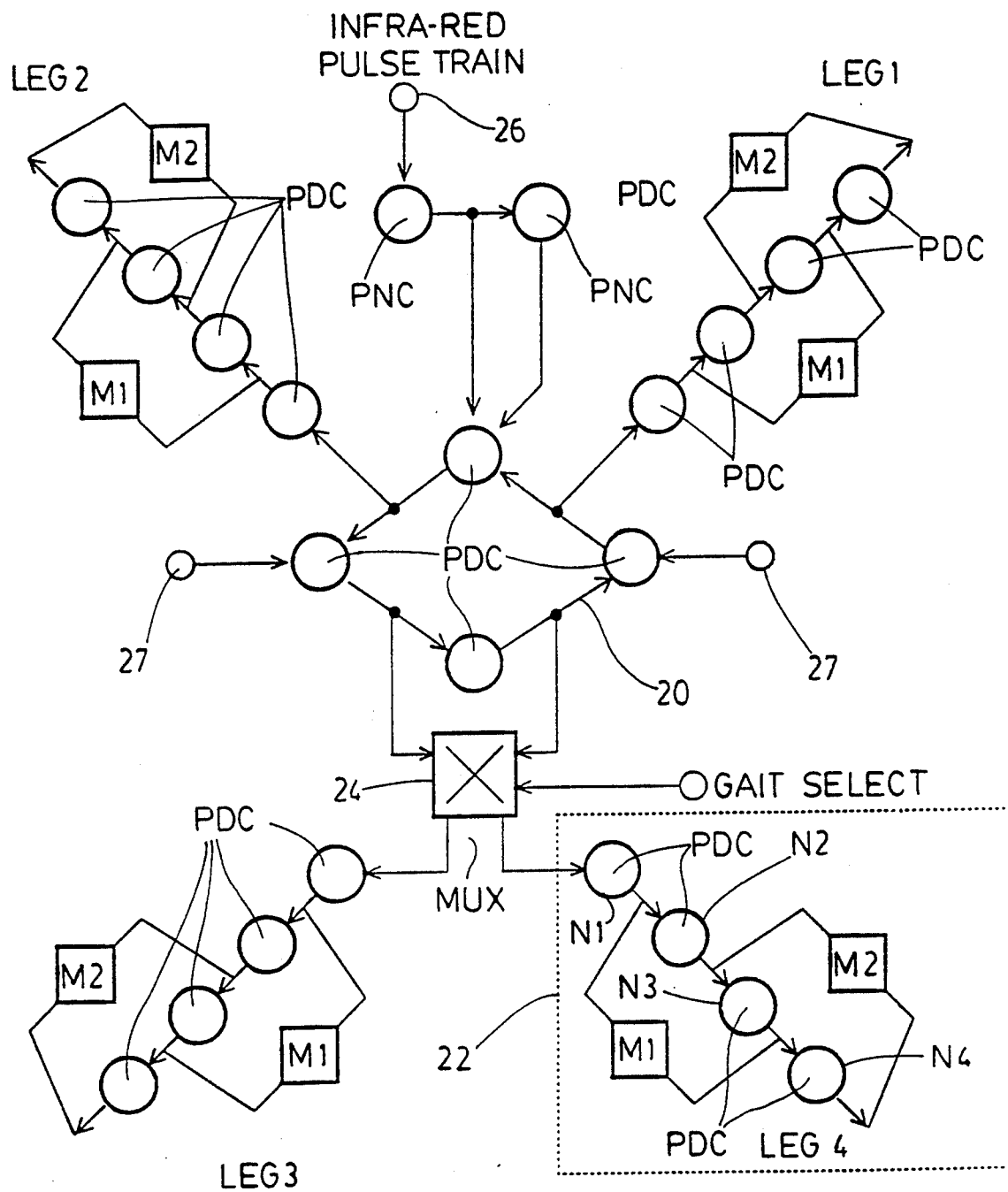
FIG. 4 is a schematic diagram of the overall control circuitry for the device of FIG. 1.

Each leg 12 is controlled by a fully autonomous chain of PDC's in series in a limb control circuit 22, as shown in FIG. 4. The limb control circuit 22 operates in exactly the same fashion as the central sequencing loop 20, except that the limb control circuit 22 is not a closed loop. To control the two-motor embodiment illustrated, each limb control circuit 22 requires four PDC's. The initiating pulse is the pulse (or pulses) propagating around the central sequencing loop 20, which periodically arrives at the input of the proximal PDC N1 in the limb control circuit and initiates movement of the limb by causing the proximal PDC N1 to fire. The firing sequence continues down the limb control circuit through the medial PDC's N2 and N3 until the distal PDC N4 fires; the pulse then dissipates. In this fashion, the PDC's in a limb control circuit 22 each fire only once, in a selected order, for every cycle of the pulse (or pulses) propagating around the central sequencing loop 20. The limb movement caused by this control sequence is described below.

Motor amplifier/drivers which drive the servo motors M1,M2 are connected to the limb control circuit 22 as illustrated in FIG. 4. Each motor M1 (for horizontal motion) and M2 (for vertical motion) is driven by two amp/drivers, each having one input. The difference across the amplifier inputs determines the direction of the motor. Each motor M1, M2 thus exhibits an exclusive OR function, and will not operate when the respective amplifier inputs are the same (i.e. 0,0 or 1,1).

The motors M1,M2 are connected to the limb control circuit 22 in the manner illustrated in FIG. 4. When the limb control circuit 22 is initiated by the pulse propagating around the central sequencing circuit 20, the proximal neuron N1 "fires" and when the pulse reaches its output the first amp/driver of the first motor M1 goes high; the second amp driver remains low, and the first motor M1 thus turns forward, pushing the limb 12 back. As the pulse propagates to the output of medial PDC N2, the first amp/driver of the first motor M1 returns to low; the second amp/driver of the first motor M1 remains low so the motor M1 stops. Meanwhile, the pulse having passed to the output of medial PDC N2, the second motor M2 is activated and turns forward to raise the limb 12. As the pulse passes to the output of medial PDC N3, the second motor M2 stops; but now the second amp/driver of the first motor M1 goes high, and the first motor M1 thus turns in reverse, drawing the limb 12 forward. Finally, the first motor M1 stops as the pulse is output from the distal PDC N4, while the second amp/driver of the second motor M2 goes high so that the second motor M2 turns in reverse and lowers the limb. The pulse then dissipates.

It will be apparent that the sequence of the motion of the motors described above—M1 forward, M2 forward, M1 reverse, M2 reverse—will cause the limb 12 to move back, lift, move forward, and then be lowered back to the starting position. This is of course the basic cycle of a walking limb. Sequence this over four limbs and the result is a forward motion.

By biasing the PDC's in the central sequencing loop 20 to fire at predetermined intervals, movement of each limb 12 is initiated at the appropriate time. The speed of the firing sequence down the chain of each limb control circuit 22 is similarly determined. However, except for the timing of the initiating pulse at the input of the proximal PDC N1, each limb control circuit 22 operates completely independently of the central sequencing loop 20. Thus, unlike in previous designs, the central sequencer need not be hard wired to each servo motor control; once movement of the limb is initiated the limb follows the pattern governed solely by the sequence and time constants of the PDC's in the limb control circuit 22. This greatly reduces the problem of interconnection complexity found in previous robotic devices, and makes autonomous robots of very small size (perhaps less than one inch square) more feasible.

The limbs 12 could each be driven by any number of motors, with PDC's added to the chain in the limb control circuits 22 accordingly. Similarly, any number of limbs can be driven simply by adding two PDC's to the central sequencing loop for each additional limb pair. However, in the simplest design, to ensure stability in a four legged embodiment the pulse propagation time in the central sequencing circuit 20 should be at least four times slower than that in the limb control circuit 22, so that only one leg moves at a time.

It is also possible to have more than one pulse propagating around the central sequencing loop 20, the number of pulses being determined by n, which represents the number of PDC's in the central sequencing loop 20. For an even number of PDC's n, the maximum number of pulses is $n/2$; for an odd number of PDC's n, the maximum number of pulses is $(n-1)/2$. In the four PDC central sequencing loop 20 illustrated, up to two pulses may propagate around the loop at any time. One propagating pulse initiates one limb 12 at a time, for a typical "crawling" gait. If another pulse is added to the loop, two legs are initiated simultaneously, permitting a "trotting" gait or a "cantering" gait if the device is walking fast enough to retain stability, depending on the limb initiation sequence. The limitation to the number of pulses which may propagate around the central sequencing loop is believed to result for the following reason.

Figure 6:
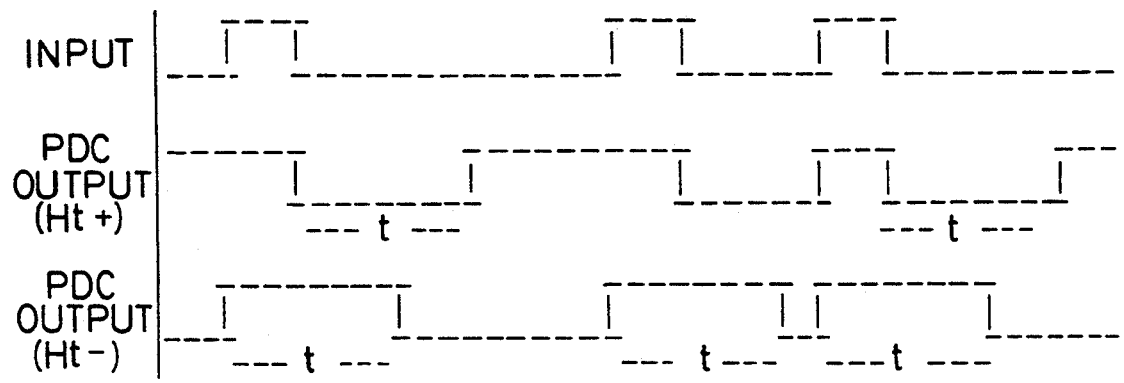
FIG. 6 is a chart showing the timing of pulse emission from two configurations of the circuit of FIG. 3.

The delay circuitry of the present invention has been found to be inherently self-stabilizing. If a PDC receives a new pulse while it is still in the process of delaying a previous pulse, the previous pulse is immediately passed to the output of the PDC and the new pulse is delayed according to the process described above. FIG. 6 illustrates a timing diagram of this process for each of these configurations, showing the time constant $t = R \times C$; Ht+ represents the configuration in which resistors R1 are referenced to ground; and Ht− represents the configuration in which resistors R1 are referenced to the source potential. In each case the polarity symbol represents the polarity logic of the propagating pulse.

It can thus be seen by the timing diagram of FIG. 6 that the central sequencing loop 20 is self-stabilizing. The timing of a pulse propagating around the series of PDC's in the central sequencing loop 20 is dependant upon the individual time constants of each PDC; if two pulses closely follow one another, the faster pulse will force the slower pulse into accelerated travel. The actual pattern of data will always remain fixed, even though the rate of travel of some pulses may be accelerated. In result, however, two pulses cannot occupy adjacent "neurons" at the same time. This is why, in a loop with an even number of PDC's, the greatest possible number of propagating pulses is n/2; in a loop with an odd number of PDC's, the greatest possible number of propagating pulses is (n−1)/2.

Upon powering up, all PDC's automatically fire due to the initial charging of the capacitors Cl; the central sequencing loop 20 immediately stabilizes to the maximum number of pulses. In the central sequencing loop 20 of FIG. 4, these pulses can be neutralized to stop all motion by applying the source potential directly to the output of any inverter in the loop 20; this prevents the capacitor Cl from discharging and effectively breaks the firing chain to the next PDC. A single pulse can be generated by applying the source potential directly to the input of any inverter in the loop 20; this drains the next following capacitor Cl which, upon charging when the source connection is removed, will fire the next following PDC to start the pulse propagation sequence. Once a pulse is propagating around the central sequencing loop 20, the limb control circuits 22 are initiated automatically in the manner described above. Through remote or local control, source applied to any inverter input will stall the device, and source applied to any invertor output will stop it.

Figure 5A:
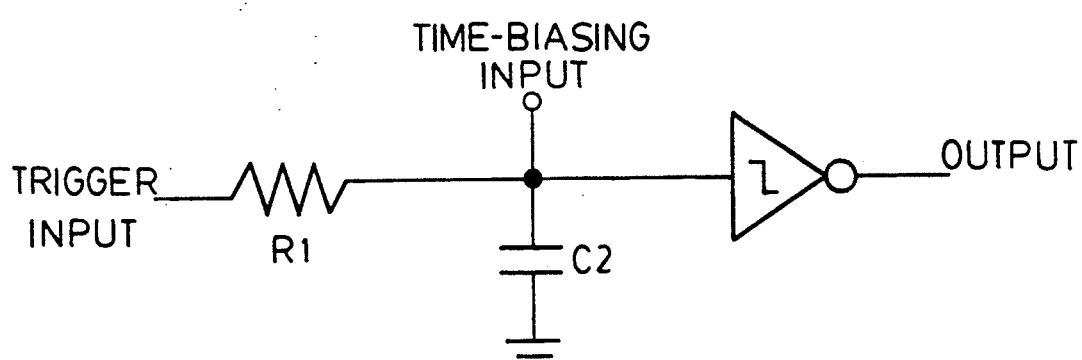
FIGS. 5A-5C are schematic diagrams of three configurations of a pulse neutralizing circuit (PNC)
Figure 5B:
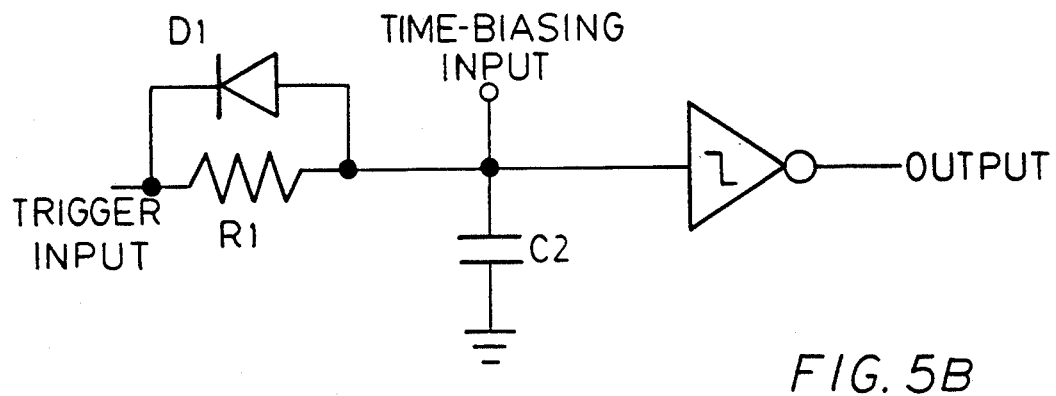
Figure 5C:
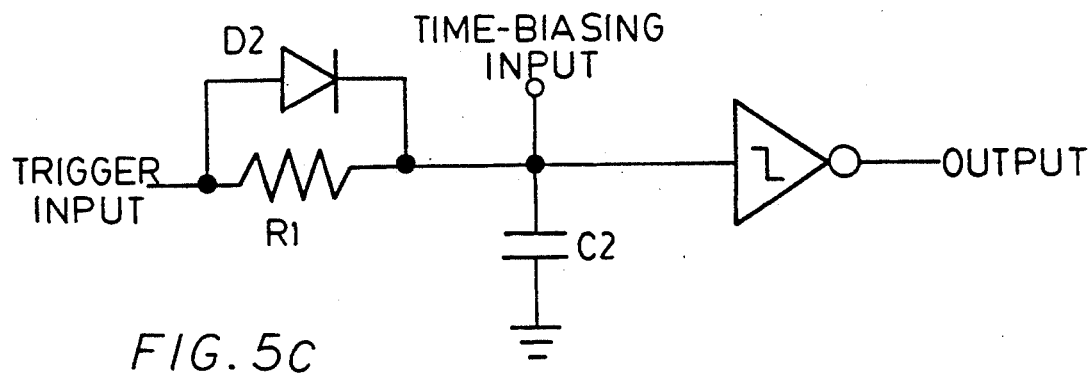

A pulse neutralizing circuit (PNC), three possible configurations of which are illustrated in FIGS. 5A–C, can also be used to neutralize these pulses and introduce pulses into the loop 20.

Figure 7:
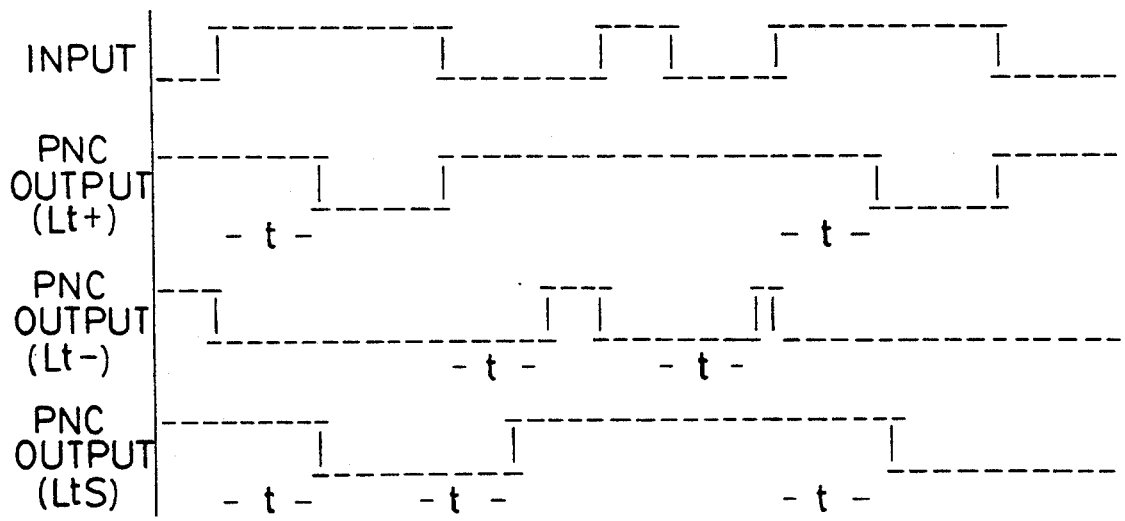
FIG. 7 is a chart showing the timing of pulse emission from the circuits of FIGS. 5A-5C.

The PNC is essentially a modified low-pass filter circuit. If designed with a symmetric time constant, as in FIG. 5A, then incoming data will be delayed by the time constant t and pulses shorter than t will be lost; i.e. the PNC will only output a signal if the incoming pulse is longer than the internal delay time t of the PNC. FIG. 7 illustrates a timing diagram of this process for each of the three configurations illustrated in FIGS. 5A–C, showing the time constant $t = R \times C$; Lts represents the configuration in which the PNC is provided with a symmetric time constant (FIG. 5A); Lt+ represents the configuration in which the capacitors C2 are referenced to ground (FIG. 5B); and Lt− represents the configuration in which capacitors C2 are referenced to the source potential (FIG. 5C).

Because the PNC only accepts pulses of a selected minimum duration, it is an effective circuit for controlling the introduction of pulses to the central sequencing loop. A sensor-stimulated pulse of any duration less than the time constant of the PNC will have no effect, while a sustained stimulation will introduce a single pulse to the loop. In the embodiment illustrated in FIG. 4 an infrared sensor 26 stimulates a FIG. 5A PNC which introduces a pulse to the central sequencing loop. If the sensor is stimulated for a sufficiently long time, the FIG. 5B PNC shunted to the FIG. 5A PNC will activate and neutralize all pulses in the central sequencing loop. This is a simple remote control activator circuit operating by infrared emitter. It will be apparent that other kinds of remote or local sensors can be employed in a similar fashion.

It is preferable to have the source potential applied to the input of an inverter in the central sequencing loop 20 while powering up, for some short period of time. Thus, upon power up the device executes one full cycle of its processes, essentially "settling in" to a ready mode, before all pulses are neutralized. A pulse may then be injected into the central sequencing loop 20 through a sensor-controlled PNC or directly from the source potential, at the input of any PDC in the loop, initiating all processes. It is believed that in more advanced designs PNC's may be introduced to the limb control circuits 22 to rectify any abberations in the pulse train, for example if a limb is blocked or jammed while in motion and it becomes necessary to reset a PDC in the limb control circuit or extend the duration of a pulse.

A multiplexer 24 may be used in a conventional way to reverse the sequence of limb motion in any particular limb or limbs 12, or the sequence of limb initiation. Biasing to change the time constants of specific PDC's in the central sequencing loop 20 will slow down or speed up overall motion of the device. Biasing PDC's in the limb control circuits 22 will permit turning by, for example, extending the speed or reach of the two limbs 12 on one side of the device relative to the two limbs 12 on the other side; the bias can be activated by a local sensor 27, as illustrated in FIGS. 1 and 4. Any number of permutations exist using simple logic gates to control multiplexing and biasing of PDC's, either remotely or automatically using local digital or analogue sensors, and the device is to this extent "adaptive" in that sequences are reconfigurable in response to sensor stimulation. Ideal sequencing and delay processes must be determined through experimentation.

The processes of the robotic device described herein are not as precise as microprocessor-driven processes, however they do fall within sufficient local minima for a multitude of tasks. It is believed that a judicious distribution of the various types of PNC's throughout the central sequencing circuit and the limb control circuits will integrate the various limb processes for smoother performance, and will facilitate the use and effects of many different types of sensors to render the device fully autonomous. However, this technology is in its infancy, and this will have to be determined through further experimentation.

It will be apparent that a walking device embodying the invention will have applications in many industries. For example, such a walking device could patrol secured premises with a video camera transmitting signals to a remote recorder; could carry out cleaning and maintenance functions in inaccessible areas such as pipes, or in hazardous areas such as nuclear reactors; or equipped with a brush it could perform simple household chores such as dusting and cleaning floors. Because of its versatility and low cost, the potential applications are unlimited.

The above description is based on a very simple embodiment of the invention for purposes of illustration. The number of combinations and permutations of the circuits described herein are believed to be infinite, but the principles involved will remain the same. Having been thus described with reference to a preferred embodiment of the invention, it will be obvious to those skilled in the art that certain modifications and adaptations may be made without departing from the scope of the invention, as set out in the appended claims.

I claim:

1. A sequencing circuit for controlling the motion of a mechanical limb actuated by at least servo motor, comprising a plurality of pulse delay circuits connected in series, in which each pulse delay circuit comprises
   an inverter for inverting an electrical pulse, the output of which is connected to a capacitor, the input of the next pulse delay circuit in the series being connected to the other side of the capacitor, and
   voltage threshold means for delaying the operation of the inverter until the capacitor has reached a predetermined charge.

2. The sequencing circuit of claim 1 in which the voltage threshold means is a Schmitt trigger.

3. The sequencing circuit of claim 1 including biasing means for selectively altering the charge rate of the capacitor to change the duration of the pulse delay.

4. The sequencing circuit of claim 2 in which the resistor has a resistance in the range of 5 mΩ to 10 MΩ and the capacitor has a capacitance approximating 0.1 μF.

5. The sequencing circuit of claim 1 in which the inverter and the voltage threshold means comprise a hex Schmitt trigger inverter.

6. The sequencing circuit of claim 1 in which the pulse delay circuits are connected to form a closed loop.

7. The sequencing circuit of claim 1 in which some pulse delay circuits are connected to form a closed loop.

8. The sequencing circuit of claim 7 in which some pulse delay circuits are connected to form a chain.

9. The sequencing circuit of claim 8 in which the chain of pulse delay circuits includes a proximal pulse delay circuit, the input of which is connected to the output of one of the pulse delay circuits in the loop.

10. An autonomous device having at least one mechanical limb, comprising
    at least one servo motor attached to the limb to actuate motion thereof,
    a central sequencing loop comprising a plurality of pulse delay circuits connected in series to form a closed loop, and
    a limb control circuit comprising a chain of pulse delay circuits, the limb control circuit having a proximal pulse delay circuit, and
    an electrical power source for creating a source potential,
    whereby the input of the proximal pulse delay circuit in the limb control circuit is connected to an output of a pulse delay circuit in the central sequencing loop, such that a pulse propagating around the central sequencing loop periodically initiates activation of the proximal pulse delay circuit in the limb control circuit.

11. The device of claim 10 wherein each pulse delay circuit comprises an inverter having a voltage threshold connected in series to a capacitor, the input of the inverter being referenced to ground or to the source potential through a resistor.

12. The device of claim 10 including a pulse neutralizing circuit for retaining the capacitors in the central sequencing loop in a charged condition, the output of which is connected to the input of a pulse delay circuit in the central sequencing loop.

13. The device of claim 11 including a pulse neutralizing circuit for retaining the capacitors in the central sequencing loop in a charged condition, the output of which is connected to the input of a pulse delay circuit in the central sequencing loop.

14. The device of claim 12 in which the pulse neutralizing circuit comprises
    an inverter for inverting an electrical pulse, the output of which is connected to a resistor,
    the input of the inverter being referenced to ground or to a source potential through a capacitor, and
    voltage threshold means for delaying the operation of the inverter until the capacitor has reached a predetermined charge.

15. A walking device including a plurality of limbs actuated by servo motors, having
    a central sequencing loop comprising a plurality of pulse delay circuits connected in series to form a closed loop,
    each servo motor being connected to a chain of pulse delay circuits connected in series and having a proximal pulse delay circuit the input of which is connected to the output of one of the pulse delay circuits in the central sequencing loop, and
    means for connecting a power source to the pulse delay circuits.

16. The walking device of claim 15 in which the power source is a DC power source and the pulse delay circuits each comprise an inverter having a voltage threshold connected in series to a capacitor the other side of which capacitor is referenced to source potential or to ground through a resistor.

17. The walking device of claim 16 in which the inverter is a hex Schmitt trigger inverter.

18. The walking device of claim 17 further including a pulse neutralizing circuit comprising an inverter with a voltage threshold connected in series with a resistor the other side of which is referenced to source potential or to ground through a capacitor.

19. The walking device of claim 17 in which the resistor has a resistance in the range of 5 MΩ to 10 MΩ and the capacitor has a capacitance approximating 0.1 μF.

* * * * *